US010507858B2

(12) United States Patent
Bacallao

(10) Patent No.: US 10,507,858 B2
(45) Date of Patent: Dec. 17, 2019

(54) SHOPPING CART BAGGING STATION

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/102,954

(22) Filed: Aug. 14, 2018

(65) Prior Publication Data

US 2019/0061798 A1    Feb. 28, 2019

Related U.S. Application Data

(60) Provisional application No. 62/550,175, filed on Aug. 25, 2017.

(51) Int. Cl.
*B62B 3/00* (2006.01)
*B62B 3/14* (2006.01)
*B62B 3/10* (2006.01)

(52) U.S. Cl.
CPC ........... *B62B 3/1464* (2013.01); *B62B 3/106* (2013.01); *B62B 3/1472* (2013.01); *B62B 2202/26* (2013.01)

(58) Field of Classification Search
CPC ..... B62B 3/1464; B62B 3/106; B62B 3/1472; B62B 2202/26
USPC ........................................................ 224/411
See application file for complete search history.

(56) References Cited

U.S. PATENT DOCUMENTS

| 259,932 A | 6/1882 | Sims |
| 370,563 A | 9/1887 | Simmons |
| 477,235 A | 6/1892 | Timmerman |
| 562,229 A | 6/1896 | Lenney |

(Continued)

FOREIGN PATENT DOCUMENTS

| AU | 1142402 A1 | 4/2002 |
| AU | 2002364902 A1 | 5/2004 |

(Continued)

OTHER PUBLICATIONS

Notice of Allowance in U.S. Appl. No. 15/383,126 dated Jan. 15, 2019; 5 pages.

(Continued)

*Primary Examiner* — Peter N Helvey
(74) *Attorney, Agent, or Firm* — Schmeiser, Olsen & Watts LLP; Karen E. Jachimowicz

(57) ABSTRACT

Described is a shopping cart bagging station that is used in retail stores to dispense shopping bags while a customer of the retail store shops. The shopping cart bagging station holds and dispenses shopping bags. The shopping cart bagging station is coupled to a shopping cart so that the customer can load items they purchase into the shopping bags as they shop. The shopping cart bagging station includes a support bar, three top hooks coupled to the support bar, and three bottom hooks coupled to the support bar. The three top hooks couple the shopping cart bagging station to a shopping cart. The three bottom hooks hold shopping bags. By using the shopping cart bagging station, a customer does not have to visit a checkout station to have their purchased items bagged.

18 Claims, 6 Drawing Sheets

(56) References Cited

U.S. PATENT DOCUMENTS

| | | | |
|---|---|---|---|
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thurmann | |
| 890,693 A | 6/1908 | McCoy | |
| 893,930 A | 7/1908 | Lederman | |
| 896,443 A | 8/1908 | Dyett | |
| D936,736 | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,281,656 A | 10/1918 | Raschick | |
| 1,284,579 A | 11/1918 | Brown | |
| 1,653,393 A | 12/1927 | Cox | |
| 1,662,140 A | 3/1928 | Whitesides | |
| 2,240,629 A | 5/1941 | Smith | |
| 2,305,863 A | 12/1942 | Ginter | |
| 2,498,446 A | 2/1950 | Pawsat | |
| 2,563,679 A * | 8/1951 | Hardy | B62J 1/165 224/415 |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,861,630 A | 1/1975 | Ady | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,398,689 A | 8/1983 | Prader | |
| 4,403,807 A | 9/1983 | Wilkinson et al. | |
| 4,456,125 A | 6/1984 | Chap | |
| 4,480,810 A | 11/1984 | Hall | |
| 4,576,388 A | 3/1986 | Pope | |
| 4,583,753 A * | 4/1986 | Economy | B62B 3/1428 224/411 |
| 4,595,153 A | 6/1986 | Goetz | |
| 4,655,409 A | 4/1987 | Zima | |
| 4,682,782 A | 7/1987 | Mills | |
| 4,702,402 A | 10/1987 | Ferri | |
| 4,728,070 A | 3/1988 | Engelbrecht | |
| 4,838,504 A | 6/1989 | Bittenbinder | |
| 4,840,336 A | 6/1989 | Stroh et al. | |
| D302,062 S | 7/1989 | Sable | |
| 4,858,862 A | 8/1989 | Prader | |
| 4,863,125 A | 9/1989 | Bateman | |
| 4,881,577 A | 11/1989 | Stroh et al. | |
| 4,881,706 A | 11/1989 | Sedlik | |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A | 3/1991 | Barteaux | |
| 5,002,215 A | 3/1991 | Gregoire | |
| 5,005,791 A | 4/1991 | Lanzen | |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A | 5/1996 | Bresnahan | |
| 5,531,366 A | 7/1996 | Strom | |
| 5,533,361 A | 7/1996 | Halpem | |
| 5,564,566 A | 10/1996 | Lamb | |
| 5,618,008 A | 4/1997 | Dearwester et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| 5,915,584 A | 6/1999 | Sposit et al. | |
| D412,080 S | 7/1999 | Emery et al. | |
| 5,924,573 A | 7/1999 | Piraneo et al. | |
| 5,979,841 A | 11/1999 | Piraneo et al. | |
| 6,018,397 A | 1/2000 | Cloutier et al. | |
| 6,041,945 A | 3/2000 | Faraj | |
| 6,086,023 A | 7/2000 | Kerr | |
| 6,109,462 A | 8/2000 | Emalfarb et al. | |
| 6,152,408 A | 11/2000 | O'Grady | |
| 6,155,521 A | 12/2000 | O'hanlon | |
| 6,170,679 B1 | 1/2001 | Frye | |
| 6,193,265 B1 | 2/2001 | Yemini | |
| 6,264,035 B1 | 7/2001 | Petrie | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,374,577 B1 | 4/2002 | Ventura | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 | 4/2004 | Scola | |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B1 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 | 10/2006 | Galle | |
| 7,172,092 B2 | 2/2007 | Yang et al. | |
| 7,177,820 B2 | 2/2007 | Mcintyre et al. | |
| 7,182,210 B2 | 2/2007 | Metcalf | |
| 7,192,035 B1 | 3/2007 | Lioce | |
| D540,591 S | 4/2007 | Snell | |
| 7,222,363 B2 | 5/2007 | Rice et al. | |
| D552,901 S | 10/2007 | Wilfong, Jr. et al. | |
| D571,518 S | 6/2008 | Waldman | |
| D575,973 S | 9/2008 | Goodman et al. | |
| 7,431,208 B2 | 10/2008 | Feldman et al. | |
| 7,475,885 B2 | 1/2009 | Kovath | |
| 7,530,537 B2 | 5/2009 | Kandah | |
| 7,587,756 B2 | 9/2009 | Peart et al. | |
| 7,610,717 B2 | 11/2009 | Luken et al. | |
| 7,654,409 B2 | 2/2010 | Hoffman | |

(56) References Cited

U.S. PATENT DOCUMENTS

| | | |
|---|---|---|
| 7,677,507 B1 | 3/2010 | Rothbauer et al. |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| 3,403,343 A1 | 3/2013 | Seawel |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1* | 12/2015 | Tong .................. B62B 3/102 |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 10,173,708 B1 | 1/2019 | Bacallao |
| 10,179,599 B1 | 1/2019 | Lambrecht |
| 2001/0022333 A1 | 9/2001 | Banko |
| 2002/0060276 A1 | 5/2002 | Rosier |
| 2002/0145086 A1* | 10/2002 | Alvarado .............. A47F 13/085 248/95 |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0026439 A1 | 2/2004 | Bolton |
| 2004/0075015 A1 | 4/2004 | Cain et al. |
| 2004/0104316 A1 | 6/2004 | Turvey |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0040615 A1 | 2/2005 | Frommherz |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1* | 3/2006 | Pennell ................ B62B 3/1464 280/33.992 |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1* | 12/2007 | Kandah .............. B65B 67/1216 248/99 |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1* | 4/2009 | Rolim de Oliveira ..................... A45C 3/045 383/7 |
| 2009/0184162 A1 | 7/2009 | Beck et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0218370 A1 | 9/2010 | Lin |
| 2010/0219219 A1 | 9/2010 | Svetina |
| 2010/0264101 A1* | 10/2010 | Ma ...................... A47G 25/06 211/85.15 |
| 2010/0289234 A1 | 11/2010 | Sonnendoifer et al. |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1* | 2/2013 | Ling .................. B62B 3/146 224/411 |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2015/0048039 A1 | 2/2015 | Laitila et al. |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1 | 10/2016 | Hendrick et al. |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174242 A1 | 6/2017 | Bacallao |
| 2017/0174243 A1* | 6/2017 | Bacallao ............. B62B 3/106 |
| 2017/0197650 A1 | 7/2017 | Whistler |
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |
| 2017/0349200 A1 | 12/2017 | Winton et al. |

(56) References Cited

U.S. PATENT DOCUMENTS

| | | |
|---|---|---|
| 2018/0009460 A1 | 1/2018 | Bacallao et al. |
| 2018/0027994 A1 | 2/2018 | Bacallao et al. |
| 2018/0049564 A1 | 2/2018 | Bacallao |
| 2018/0093690 A1 | 4/2018 | Bacallao et al. |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2468351 A | 9/2010 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Non-Final Office Action in U.S. Appl. No. 15/433,365 dated Feb. 5, 2019; 8 pages.
Restriction Requirement in U.S. Appl. No. 15/676,143 dated Apr. 1, 2019; 6 pages.
Non-Final Office Action in U.S. Appl. No. 15/676,218 dated Feb. 22, 2019; 12 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser FOR Retail Supermarket Brand New!" Ebay.com, accessed on Nov. 17, 2016; 5 pages.

"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," Organizelt.com, accessed on Jun. 14, 2017; 2 pages.
"Simplehuman Stainless Steel Grocery Bag Holder," ContainerStore.com, accessed on Jun. 14, 2017; 2 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.
Non-Final Office Action in U.S. Appl. No. 15/383,151, dated May 25, 2018; 13 pages.
Non-Final Office Action in U.S. Appl. No. 15/383,170, dated Jul. 3, 2018; 10 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.
Restriction Requirement in U.S. Appl. No. 15/433,365 dated Dec. 31, 2018; 5 pages.
Non-Final Office Action in U.S. Appl. No. 15/433,388 dated Dec. 31, 2018; 6 pages.
Final Office Action in U.S. Appl. No. 15/676,218, dated Jul. 25, 2019; 7 pages.
Non-Final Office Action in U.S. Appl. No. 16/238,705 dated Apr. 18, 2019; 7 pages.
Notice of Allowance in U.S. Appl. No. 15/433,365 dated Apr. 18, 2019; 5 pages.

(56) References Cited

OTHER PUBLICATIONS

Notice of Allowance and Fees Due in U.S. Appl. No. 15/433,388, dated May 21, 2019; 5 pages.
Notice of Allowance in U.S. Appl. No. 16/239,064 dated Aug. 15, 2019; 13 pages.
Notice of Allowance in U.S. Appl. No. 16/238,705 dated Aug. 21, 2019; 5 pages.
Notice of Allowance in U.S. Appl. No. 15/676,218 dated Sep. 16, 2019; 10 pages.
Notice of Allowance in U.S. Appl. No. 15/676,143 dated Sep. 12, 2019; 8 pages.

* cited by examiner

SHOPPING CART BAGGING STATION

CROSS REFERENCE TO RELATED APPLICATION

This invention claims priority to U.S. provisional patent application Ser. No. 62/550,175, filed Aug. 25, 2017, and entitled "Shopping Cart Bagging Station", which is incorporated entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations besides checkout stations. There is a need for bagging stations in locations in retail stores besides at the checkout station. Additionally, there is a need for a bagging station that can withstand extreme temperatures and hold bags with heavy items.

Accordingly, what is needed is a bagging station that can be mounted in a shopping cart, that is durable and compact, and can hold bags with heavy items in them.

DETAILED DESCRIPTION OF EMBODIMENTS OF THE INVENTION

Figure 1:
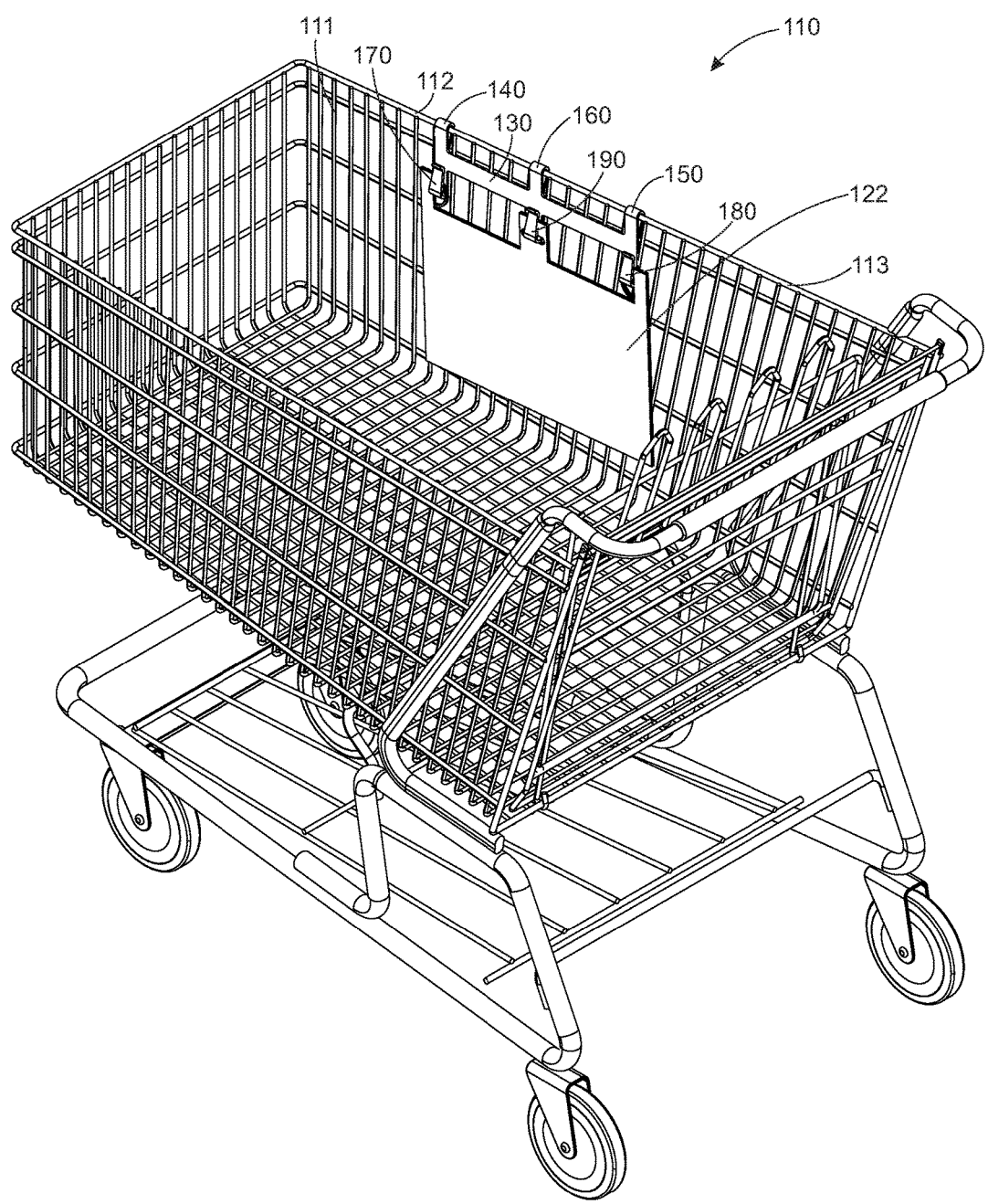
FIG. 1 shows a combination of a shopping cart bagging station and a shopping cart, with the shopping cart bagging station coupled to the shopping cart.

Disclosed herein are embodiments of an invention related to retail store fixtures, and, more specifically, to a bagging station that is used in combination with a shopping cart. A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. The disclosed shopping cart bagging station can be used by customers to bag their purchases as they shop or by employees bagging items for a customer. The disclosed shopping cart bagging station is designed to be heavy duty so that it can be used by customers, and by employees, such as in pick-up areas and other areas that require a bagging station that can withstand temperatures and handle heavy loads.

In a specific embodiment, the disclosed shopping cart bagging station includes a support bar, three top hooks coupled to the support bar, and three bottom hooks coupled to the support bar. The three top hooks couple the bagging station to a shopping cart. The three bottom hooks hold and dispense the shopping bags. The support bar, the three top hooks, and the three bottom hooks are formed of a rigid material that can withstand extremes in temperature and hold heavy loads.

The shopping cart bagging station holds a plurality of shopping bags and dispenses the shopping bags one at a time as products are placed in a shopping bag. One of the bottom hooks holds a stack of shopping bags ready to be opened and filled. The other two bottom hooks each hold a handle of a shopping bag so the shopping bag is held open and items can be placed in the shopping bag. The three top hooks are a means to couple the bagging station to a shopping cart. The three top hooks can couple to, or hang from, a top rail or any suitable rail of a shopping cart.

In another embodiment, the shopping cart bagging station includes the support bar and three top hooks. The three top hooks hold and dispense the shopping bags and also couple the shopping cart bagging station to the shopping cart.

The shopping cart bagging station can be mounted at various locations on a shopping cart, making it easy and convenient for a customer to carry and load a plurality of shopping bags as they shop. The disclosed shopping cart bagging station provides a means for a customer to load purchases into bags as they shop, instead of having to bag their purchases at a checkout station. And, the disclosed shopping cart bagging station provides a way for employees to load and carry a maximum number of bags with a shopping cart at a pickup station.

FIG. 1 shows a combination of a shopping cart 113 and a shopping cart bagging station 110. Shopping cart bagging station 110 is coupled to a side 111 of shopping cart 113. Shopping cart bagging station 110 is used to hold and dispense at least one shopping bag 122. Shopping cart bagging station 110 includes three top hooks, including a first top hook 140, a second top hook 150, and a third top hook 160. Each one of three top hooks 140, 150, and 160 are coupled to a support bar 130. Three top hooks 140, 150 and 160 couple shopping cart bagging station 110 to side 111 of shopping cart 113, as shown in FIG. 1. Each one of top hooks 140, 150, and 160 couple to a rod 112 of shopping cart 113 in this embodiment.

Shopping cart bagging station 110 also includes three bottom hooks, including a first bottom hook 170, a second bottom hook 180, and a third bottom hook 190. Bottom hooks 170, 180, and 190 are used to hold and dispense shopping bags 122. At least one shopping bag 122 is hung from its hanger hole on third bottom hook 190, as shown in FIG. 1. First and second bottom hook 170 and 180 each hold a handle of one or more shopping bag 122. With at least one shopping bag 122 hung from three bottom hooks 170, 180, and 190, and three top hooks 140, 150, and 160 coupling shopping cart bagging station 110 to shopping cart 113, shopping cart bagging station 110 is used to hold and dispense shopping bags 122 for a customer using shopping cart 113. When the customer desires to fill a shopping bag 122, a front side of shopping bag 122 is pulled away from third bottom hook 190 to leave shopping bag 122 open but still hanging from shopping cart bagging station 110. Items are placed in shopping bag 122 until shopping bag 122 is full. Shopping bag 122 is removed from shopping cart bagging station 110 by pulling it away from bottom hooks 170, 180, and 190. Shopping bag 122, with purchased items in it, is placed in shopping cart 113 or removed from the retail store. If it is desired to fill another shopping bag, the next one of at least one shopping bag 122 is opened and filled.

Figure 2:
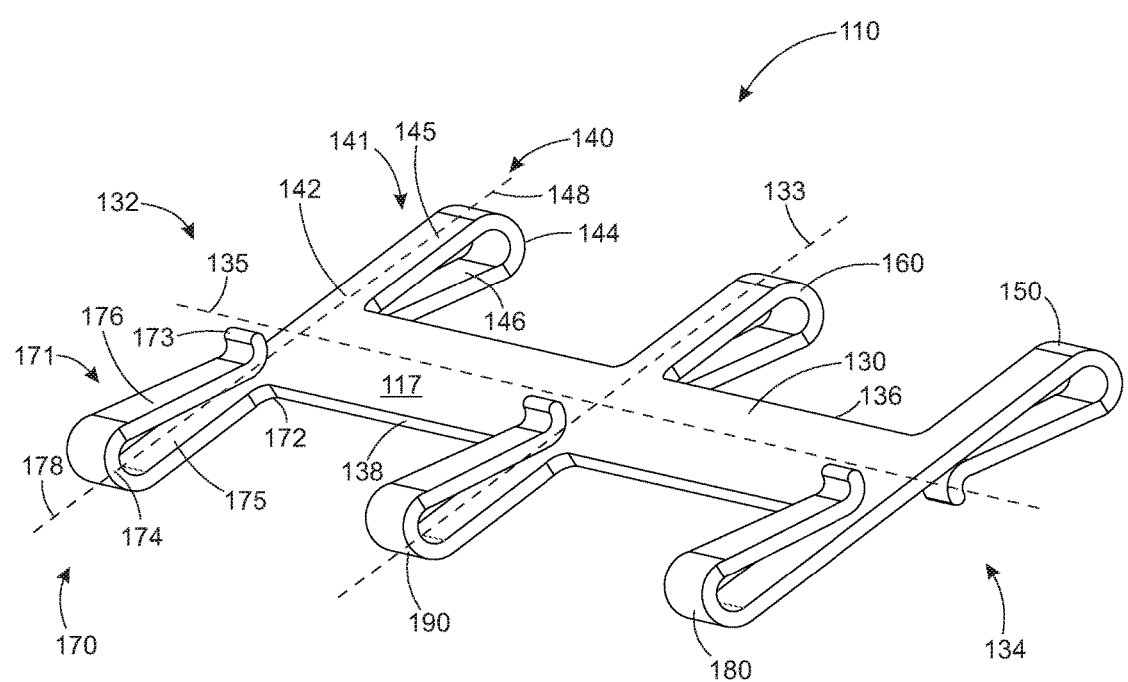
FIG. 2 shows a front perspective view of the shopping cart bagging station of FIG. 1.
Figure 3:
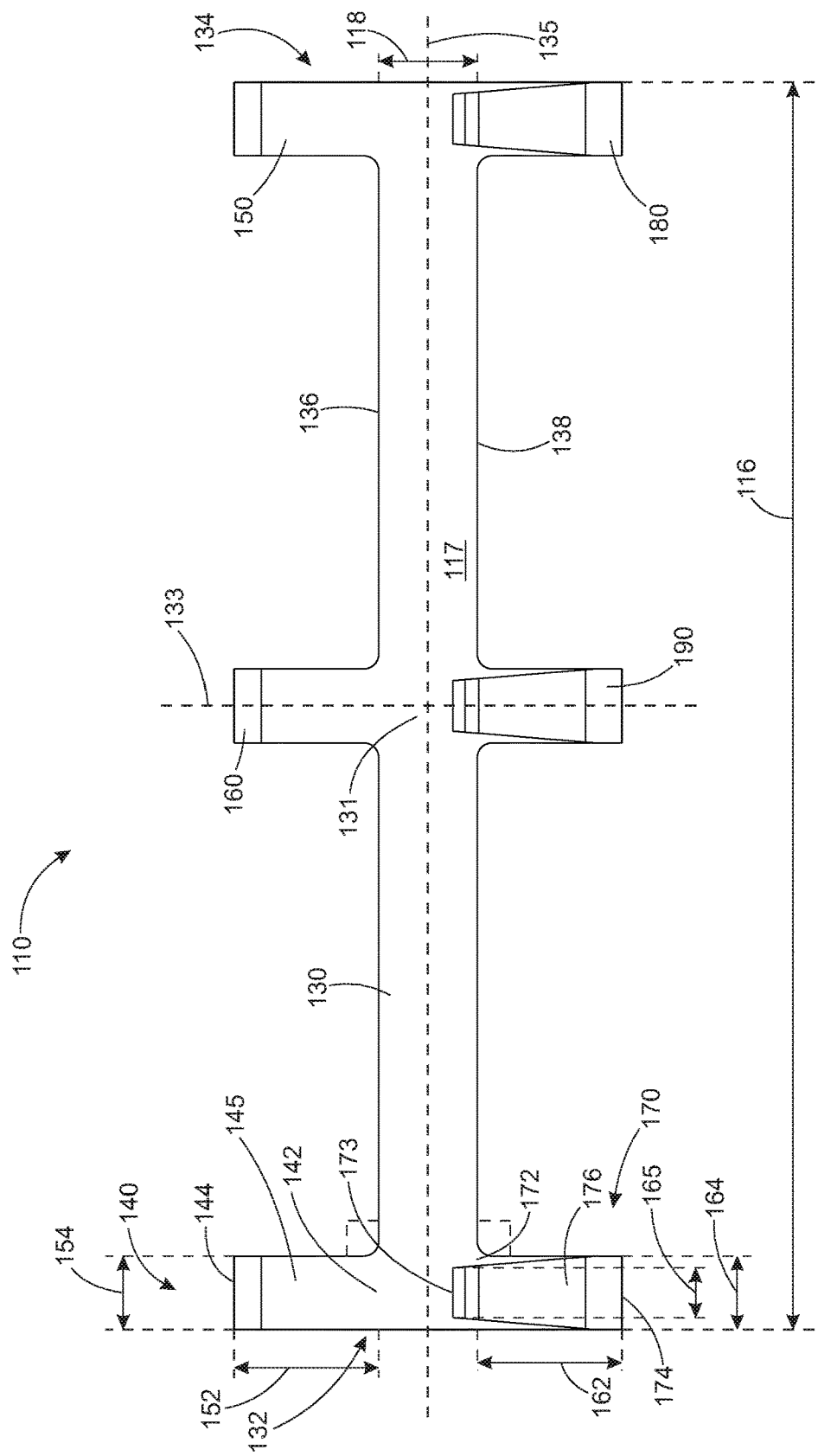
FIG. 3 shows a front view of the shopping cart bagging station of FIG. 1.
Figure 4:
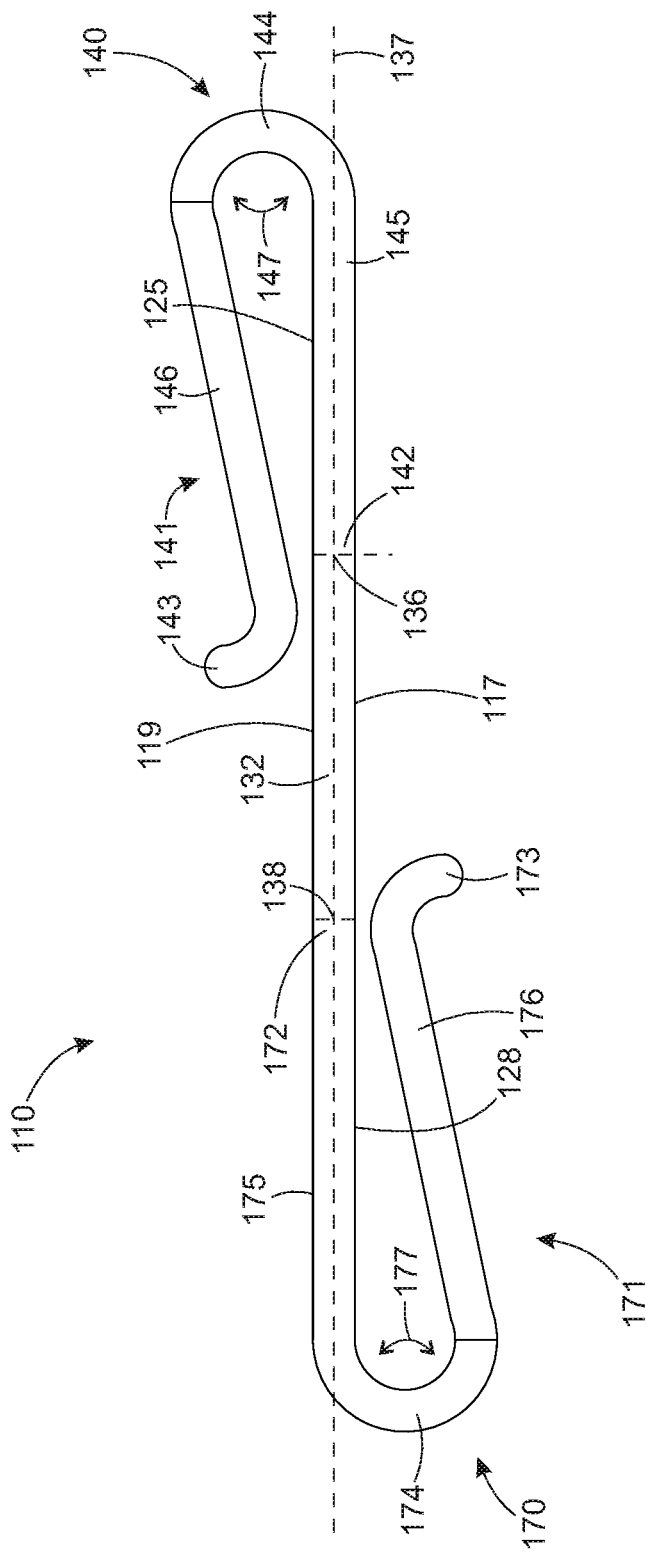
FIG. 4 shows an end view of the shopping cart bagging station of FIG. 1.
Figure 5:
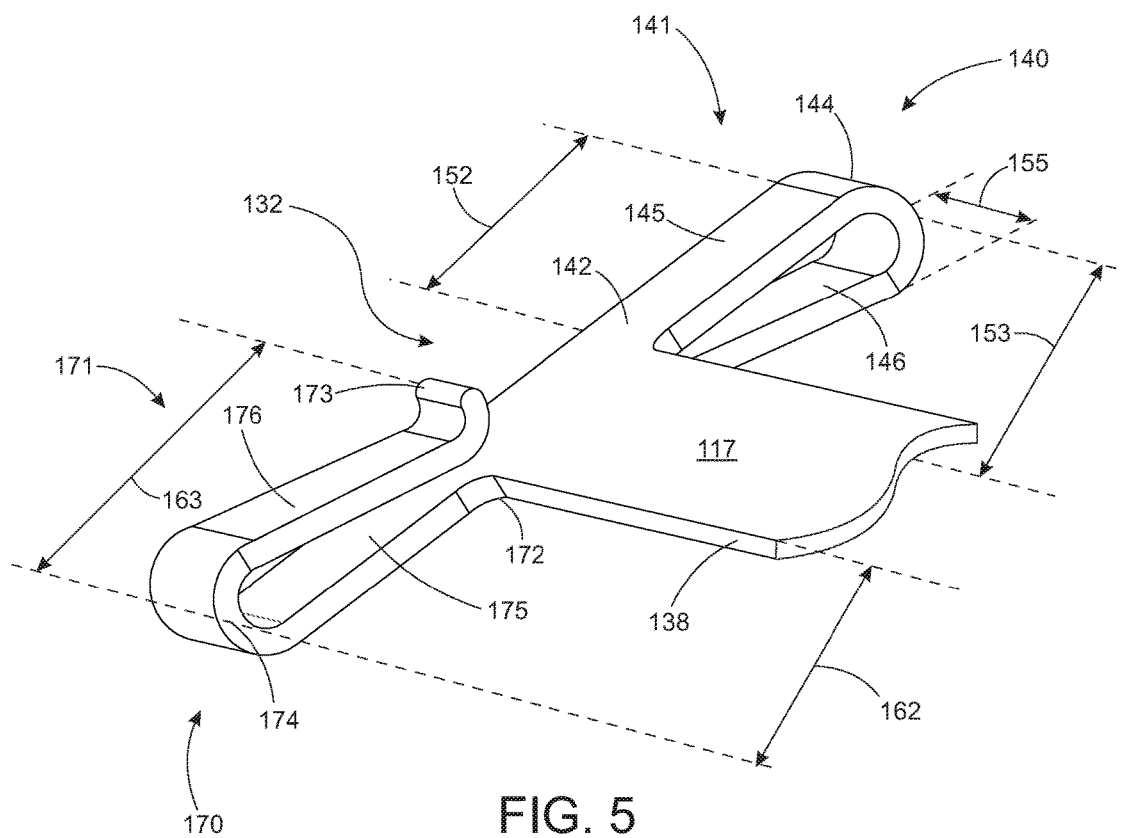
FIG. 5 shows a close-up front perspective view of a first end of the shopping cart bagging station of FIG. 1.

FIG. 2 through FIG. 5 shows additional details of shopping cart bagging station 110. FIG. 2 shows a front perspective view of shopping cart bagging station 110. FIG. 3 shows a front view of bagging station 110. FIG. 4 shows an end view of shopping cart bagging station 110, looking down a first end 132 of a support bar 130 of shopping cart bagging station 110. FIG. 5 shows a close-up front perspective view of first end 132 of support bar 130 and first top hook 140 and first bottom hook 170.

Shopping cart bagging station 110 includes support bar 130, three top hooks 140, 150, and 160 fixedly attached to a support bar top edge 136, and three bottom hooks 170, 180, 190 fixedly attached to a support bar bottom edge 138, as shown in FIG. 2 and FIG. 3

Support bar 130 is a structural frame of shopping cart bagging station 110. Support bar 130 has a support bar first end 132, a support bar second end 134 opposing support bar first end 132, support bar top edge 136 and support bar bottom edge 138. Support bar 130 also has a support bar front surface 117 and a support bar rear surface 119 (best seen in FIG. 4). Support bar 130 is a flat rectangular bar of rigid material. Support bar 130 is formed of plastic in this embodiment, but this is not meant to be limiting. Support bar 130 can be formed of metal, wood, composites, or any suitable rigid material. Support bar 130 has a lateral axis 133 and a longitudinal axis 135 (FIG. 2 and FIG. 3). Support bar longitudinal axis 135 and support bar lateral axis 133 lie in a support bar plane 137 (FIG. 4). Support bar 130 has a length 116 and a width 118, as shown in FIG. 3. Support bar 130 has support bar length to width ratio of about 15:1, in this embodiment. A support bar length to width ratio of between about 10:1 and about 20:1 has been shown to give support bar 130 the strength it needs to hold a full shopping bag 122 without breaking, and not be too heavy. In some embodiments, support bar 130 has support bar length to width ratio of about 10:1. In some embodiments, support bar 130 has support bar length to width ratio of about 20:1.

Each of three top hooks 140, 150, and 160 are fixedly coupled to support bar top edge 136. In this embodiment, first top hook 140 is coupled to support bar 130 at support bar first end 132, second top hook 150 is coupled to support bar 130 at support bar second end 134, and third top hook 160 is coupled to support bar 130 at a support bar midpoint 131 (FIG. 3) that is about halfway between support bar first end 132 and support bar second end 134.

Each of three top hooks 140, 150, and 160 have the same features. Details will be provided herein for first top hook 140. The descriptions for second and third top hooks 150 and 160 are the same as for top hook 140.

First top hook 140 is formed of a first top hook bar 141 that is folded to create a hook shape. First top hook bar 141 is folded towards support bar rear surface 119. First top hook bar 141 of first top hook 140 folds towards support bar rear surface 119 so that when first top hook 140 of bagging station 110 is coupled to shopping cart 113, support bar rear surface 119 is against shopping cart side 111 of shopping cart 113. Top hook bar 141 includes a top hook bar first end 142 that is coupled to support bar top edge 136, and a top hook bar second end 143 opposing top hook bar first end 142. Top hook bar 141 has a top hook bar longitudinal axis 148 (FIG. 2) that is perpendicular to support bar longitudinal axis 135 and lies in support bar plane 137. Top hook bar 141 is folded over on itself at a top hook bar lateral bend 144, best seen in FIG. 4. Top hook bar lateral bend 144 is between top hook bar first end 142 and top hook bar second end 143. Top hook bar 141 folds back on itself at top hook bar lateral bend 144, forming a top hook bar angle 147 (FIG. 4) that is between about 10 degrees to about 50 degrees. This range of angles for top hook bar angle 147 provides a first top hook 140 that hooks easily onto shopping cart 113 and does not allow too much play in the mounting of shopping cart bagging station 110. In this embodiment, top hook bar angle 147 is about 30 degrees.

Top hook bar lateral bend 144 divides top hook bar 141 into a top shank portion 145 and a top hook end portion 146. Top shank portion 145 extends from top hook bar first end 142 to top hook bar lateral bend 144. Top shank portion 145 extends perpendicularly from support bar top edge 136 and lies in support bar plane 137 (FIG. 4). Top shank portion 145 has a top shank portion length 152 and a top shank portion width 154 (FIG. 3 and FIG. 5). In this embodiment, top shank portion width 154 is constant along top shank portion length 152. Top shank portion 145 is straight and lies in support bar plane 137.

Top hook end portion 146 extends from top hook bar lateral bend 144 to top hook bar second end 143. Top hook bar 141 folds back over itself at top hook bar lateral bend 144, with top hook bar angle 147 formed between top shank portion 145 and top hook end portion 146. Top hook end portion 146 has a top hook end portion length 153 (FIG. 5) and a top hook end portion width 155. Top hook end portion width 155 is not constant over top hook end portion length 153 in this embodiment. Top hook end portion width 155 tapers along top hook end portion length 153. In this embodiment, top hook end portion width 155 is smaller at top hook bar second end 143 than at top hook bar lateral bend 144. Top hook end portion 146 is longer than top shank portion 145 in this embodiment. Top hook bar lateral bend 144 is not halfway between top hook bar first end 142 and top hook bar second end 143. In this embodiment, top hook end portion length 153 is larger than top shank portion length 152.

Top hook end portion 146 folds over a top shank portion rear surface 125 (FIG. 4 and FIG. 5). Top shank portion rear surface 125 is coplanar with support bar rear surface 119. Top hook end portion 146 has an S-shaped cross section in side view as shown in FIG. 4. The S-shaped cross section of top hook end portion 146 provides an out-turned top hook bar end 143 that makes it easy to slide rod 112 of shopping cart 113 into top hook 140. Top hook bar angle 147 accepts and holds rod 112 of shopping cart 113.

Second top hook 150 and third top hook 160 are constructed the same as first top hook 140, and the description of first top hook 140 applies to second and third top hooks 150 and 160. Each of first, second, and third top hooks 140, 150, and 160 hook onto rod 112 of side 111 of shopping cart 113 to couple shopping cart bagging station to shopping cart 113.

Each of three bottom hooks 170, 180, and 190 are fixedly coupled to support bar bottom edge 138, see FIG. 2 and FIG. 3. In this embodiment, first bottom hook 170 is coupled to support bar 130 at support bar first end 132, second bottom hook 180 is coupled to support bar 130 at support bar second end 134, and third bottom hook 190 is coupled to support bar 130 at support bar midpoint 131 (FIG. 3) that is about halfway between support bar first end 132 and support bar second end 134.

Each of three bottom hooks 170, 180, and 190 have the same features. Details will be provided herein for first bottom hook 170. The descriptions for second and third bottom hooks 180 and 190 are the same as for bottom hook 170.

First bottom hook 170 is formed of a bottom hook bar 171 that is folded to create a hook shape. First bottom hook bar 171 folds towards support bar front surface 117. First bottom hook bar 171 of first bottom hook 170 folds towards support bar front surface 117 so that when bagging station 110 is coupled to shopping cart 113, first bottom hook 170 folds or faces away from shopping cart side 111 of shopping cart 113 so that shopping bags can be hung on first bottom hook 170. Bottom hook bar 171 includes a bottom hook bar first end 172 that is coupled to support bar bottom edge 138, and a bottom hook bar second end 173 opposing bottom hook bar first end 172. Bottom hook bar 171 has a bottom hook bar longitudinal axis 178 (FIG. 2) that is perpendicular to support bar longitudinal axis 135 and lies in support bar plane 137. Bottom hook bar longitudinal axis 178 is collinear with top hook bar longitudinal axis 148. Each bottom hook 170, 180, and 190 has a bottom hook bar longitudinal axis that is collinear with a corresponding top hook bar longitudinal axis of top hook bars 140, 150, and 160.

Bottom hook bar 171 is folded over on itself at a bottom hook bar lateral bend 174, best seen in FIG. 4 and FIG. 5. Bottom hook bar lateral bend 174 is between bottom hook bar first end 172 and bottom hook bar second end 173. Bottom hook bar 171 folds back on itself at bottom hook bar lateral bend 174, forming a bottom hook bar angle 177 (FIG. 4) that is between about 10 degrees to about 50 degrees. This range of angles for bottom hook bar angle 177 provides a first bottom hook 170 that easily accepts and holds a handle or an arm of a shopping bag. In this embodiment, bottom hook bar angle 177 is about 30 degrees.

Bottom hook bar lateral bend 174 divides bottom hook bar 171 into a bottom shank portion 175 and a bottom hook end portion 176. Bottom shank portion 175 extends from bottom hook bar first end 172 to bottom hook bar lateral bend 174. Bottom shank portion 175 extends perpendicularly from support bar bottom edge 138 and lies in support bar plane 137 (FIG. 4). Bottom shank portion 175 has a bottom shank portion length 162 (FIG. 5) and a bottom shank portion width 164 (FIG. 3). In this embodiment, bottom shank portion width 164 is constant along bottom shank portion length 162. Bottom shank portion 175 is straight and lies in support bar plane 137.

Bottom hook end portion 176 extends from bottom hook bar lateral bend 174 to bottom hook bar second end 173. Bottom hook bar 171 folds back over itself at bottom hook bar lateral bend 174, with bottom hook bar angle 177 formed between bottom shank portion 175 and bottom hook end portion 176. Bottom hook end portion 176 has a bottom hook end portion length 163 (FIG. 5) and a bottom hook end portion width 165 (FIG. 3). Bottom hook end portion width 165 is not constant over bottom hook end portion length 163 in this embodiment. Bottom hook end portion width 165 tapers along bottom hook end portion length 163. In this embodiment, bottom hook end portion width 165 is smaller at bottom hook bar second end 173 than at bottom hook bar lateral bend 174. In this embodiment, bottom hook end portion width 165 is smaller than bottom shank portion width 164. Bottom hook end portion 176 is longer than bottom shank portion 175 in this embodiment. Bottom hook bar lateral bend 174 is not halfway between bottom hook bar first end 172 and bottom hook bar second end 173. In this embodiment, bottom hook end portion length 163 is larger than bottom shank portion length 162.

Bottom hook end portion 176 folds over a bottom shank portion front surface 128 (FIG. 4 and FIG. 5). Bottom shank portion front surface 128 is coplanar with support bar front surface 117. Bottom hook end portion 176 has an S-shaped cross section as shown in FIG. 4. The S-shaped cross section of bottom hook end portion 176 provides an out-turned bottom hook bar end 173 that makes it easy to slide rod 112 of shopping cart 113 into top hook 170. Bottom hook bar angle 177 accepts and holds rod 112 of shopping cart 113.

Second bottom hook 180 and third bottom hook 190 are constructed the same as first bottom hook 170 and have a corresponding description as the description provided for first bottom hook 170.

First, second, and third bottom hooks 170, 180, and 190 are used to hold and dispense at least one shopping bag 122. First and second bottom hooks 170 and 180 each hold handles of shopping bags 122. Third bottom hook 190 is used to hang shopping bags 122 from. First, second, and third top hooks 140, 150, and 160 fold towards support bar rear surface 119 to couple bagging station 110 to shopping cart 113. First, second, and third bottom hooks 170, 180, and 190 fold towards support bar front surface 117 to be available to hang shopping bags from.

With first, second, and third top hooks 140, 150, and 160 coupling shopping cart bagging station 110 to shopping cart 113, and first, second, and third bottom hooks 170, 180, and 190 holding at least one shopping bag 122 as shown in FIG. 1, shopping cart bagging station 110 is ready to be used to hold and dispense shopping bags 122 as a customer uses shopping cart 113 to shop.

Figure 6:
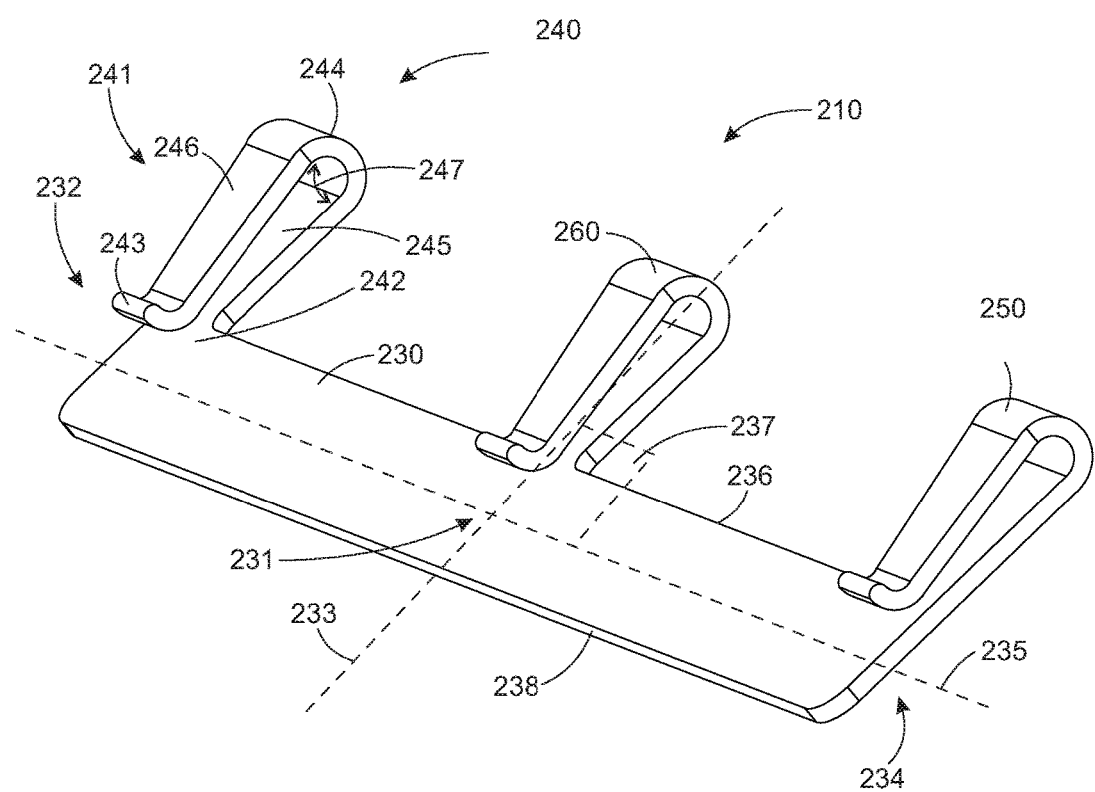
FIG. 6 shows a front perspective view of a further embodiment of a shopping cart bagging station.

FIG. 6 shows an embodiment of a shopping cart bagging station 210. Shopping cart bagging station 210 can be used to hold and dispense shopping bags, similar to shopping cart bagging station 110 as shown in FIG. 1. Shopping cart bagging station 210 includes a support bar 230 and three top hooks 240, 250, and 260 coupled to support bar 230. Three top hooks 240, 250, and 260 hold shopping bags and also couple shopping cart bagging station 210 to a shopping cart. Shopping bags are first hung on three top hooks 240, 250, and 260, usually with handles hung on first and second top hooks 240 and 250 and the shopping bag center hole hung on third top hook 260. Once shopping bags are hung on three top hooks 240, 250, and 260, support bar 230 is flipped top to bottom and hung on shopping cart 213 with the shopping bags still hung from three top hooks 240, 250, and 260. Shopping cart bagging station 210 can then be used to hold and dispense the shopping bags as a customer shops.

Shopping cart bagging station 210 includes support bar 230 and three top hooks 240, 250, and 260 fixedly attached to a support bar top edge 236 as shown in FIG. 6.

Support bar 230 is the structural frame for shopping cart bagging station 210. Support bar 230 has a support bar first end 232, a support bar second end 234 opposing support bar first end 232, support bar top edge 236 and a support bar bottom edge 238. Support bar 230 is a flat rectangular bar, plate or rod of rigid material. Support bar 230 is formed of plastic in this embodiment, but this is not meant to be limiting. Support bar 230 has a lateral axis 233 and a longitudinal axis 235. Support bar longitudinal axis 235 and support bar lateral axis 233 lie in a support bar plane 237.

Each of three top hooks 240, 250, and 260 are fixedly coupled to support bar top edge 236. In this embodiment, first top hook 240 is coupled to support bar first end 232, second top hook 250 is coupled to support bar second end 234, and third top hook 260 is coupled to support bar 230 at a support bar midpoint 231 that is about halfway between support bar first end 232 and support bar second end 234.

Each of three top hooks 240, 250, and 260 have the same features. Details will be provided herein for first top hook 240. The descriptions for second and third top hooks 250 and 260 are the same as for top hook 240.

First top hook 240 is formed of a top hook bar 241 that is folded to create a hook shape. Top hook bar 241 includes a top hook bar first end 242 that is coupled to support bar top edge 236, and a top hook bar second end 243 opposing top hook bar first end 242. Top hook bar 241 has a longitudinal axis that is perpendicular to support bar 230. Top hook bar 241 is folded over on itself at a top hook bar lateral bend 244. Top hook bar lateral bend 244 is between top hook bar first end 242 and top hook bar second end 243. Top hook bar 241 folds back on itself at top hook bar lateral bend 244, forming a top hook bar angle 247 that is between about 10 degrees to about 60 degrees. This range of angles for top hook bar angle 247 provides a first top hook 240 that hooks easily onto a shopping cart and does not allow too much play in the mounting of shopping cart bagging station 210. In this embodiment, top hook bar angle 247 is about 35 degrees.

Top hook bar lateral bend 244 divides top hook bar 241 into a top shank portion 245 and a top hook end portion 246. Top shank portion 245 extends from top hook bar first end 242 to top hook bar lateral bend 244. Top shank portion 245 is straight and extends perpendicularly from support bar top edge 236, and lies in support bar plane 237.

Top hook end portion 246 extends from top hook bar lateral bend 244 to top hook bar second end 243. Top hook bar 241 folds back over itself at top hook bar lateral bend 244, with top hook bar angle 247 formed between top shank portion 245 and top hook end portion 246. A width of top hook end portion 246 tapers along the length of top hook end portion 246.

Top hook end portion 246 folds over a front surface of top shank portion 245. Top hook end portion 246 has an S-shaped cross section. The S-shaped cross section of top hook end portion 246 provides an upturned top hook bar end 243 that makes it easy to slide a rod of the shopping cart into top hook 240. Top hook bar angle 247 accepts and holds the rod of the shopping cart.

Second top hook 250 and third top hook 260 are constructed the same as first top hook 240, and the description of first top hook 240 applies to second and third top hooks 250 and 260. Once at least one shopping bag is hung from one or all of first, second and third top hooks 240, 250, and 260, each of first, second, and third top hooks 240, 250, and 260 hook onto a rod of the shopping cart to firmly couple shopping cart bagging station to the shopping cart.

Shopping cart bagging stations have been shown and described that couple to a shopping cart and are used to hold and dispense shopping bags while a customer is using the shopping cart to shop. Shopping bags are hung from the shopping cart bagging station. The shopping cart bagging station is then coupled to a shopping cart so the customer can bag their purchased items as they shop. The shopping cart bagging station provides a convenient way for customers to bag their purchases as they shop, so they do not have to visit a checkout station to have their purchased items bagged.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
    a support bar comprising:
        a support bar first end;
        a support bar second end opposing the support bar first end;
        a support bar top edge;
        a support bar bottom edge;
        a support bar lateral axis; and
        a support bar longitudinal axis, wherein the support bar lateral axis and the support bar longitudinal axis lie in a support bar plane;
    three top hooks fixedly attached to the support bar top edge, wherein each of the three top hooks comprises:
        a top hook bar comprising:
            a top hook bar first end coupled to the support bar top edge;
            a top hook bar second end opposing the top hook bar first end; and
            a top hook bar lateral bend between the top hook bar first end and the top hook bar second end;
        a top shank portion that extends from the top hook bar first end to the top hook bar lateral bend, wherein the top shank portion extends perpendicularly from the support bar top edge, and wherein the top shank portion lies in the support bar plane; and
        a top hook end portion that extends from the top hook bar lateral bend to the top hook bar second end;
        wherein the top hook bar folds back on itself at the top hook bar lateral bend forming a top hook bar angle between the top shank portion and the top hook end portion of from about 10 degrees to about 50 degrees; and
    three bottom hooks fixedly attached to the support bar bottom edge, wherein each of the three bottom hooks comprises:
    a bottom hook bar comprising:
        a bottom hook bar first end coupled to the support bar bottom edge;
        a bottom hook bar second end opposing the bottom hook bar first end; and
        a bottom hook bar lateral bend between the bottom hook bar first end and the bottom hook bar second end;
    a bottom shank portion that extends from the bottom hook bar first end to the bottom hook bar lateral bend, wherein the bottom shank portion extends perpendicularly from the support bar bottom edge, and wherein the bottom shank portion lies in the support bar plane; and
    a bottom hook end portion that extends from the bottom hook bar lateral bend to the bottom hook bar second end;

wherein the bottom hook bar folds back on itself at the bottom hook bar lateral bend forming a bottom hook bar angle between the bottom shank portion and the bottom hook end portion of from about 10 degrees to about 50 degrees.

2. The shopping cart bagging station of claim 1, wherein a first top hook of the three top hooks is coupled to the support bar first end, a second top hook of the three top hooks is coupled to the support bar second end, and a third top hook of the three top hooks is coupled to a support bar midpoint.

3. The shopping cart bagging station of claim 1, wherein each bottom hook bar comprises a bottom hook bar longitudinal axis that is collinear with a corresponding top hook bar longitudinal axis of each corresponding top hook.

4. The shopping cart bagging station of claim 1, wherein the bottom hook end portion folds over a bottom shank portion front surface.

5. The shopping cart bagging station of claim 1, wherein the bottom hook end portion comprises an S-shaped side view cross section.

6. The shopping cart bagging station of claim 1, wherein a first top hook of the three top hooks is coupled to the support bar first end, a second top hook of the three top hooks is coupled to the support bar second end, and a third top hook of the three top hooks is coupled to a support bar midpoint.

7. The shopping cart bagging station of claim 1, wherein the bottom hook end portion folds over towards a support bar front surface, and wherein the top hook end portion folds over towards a support bar rear surface.

8. The shopping cart bagging station of claim 1, wherein the top hook end portion folds over a top shank portion rear surface.

9. The shopping cart bagging station of claim 1, wherein the top hook end portion comprises an S-shaped side view cross section.

10. The shopping cart bagging station of claim 1, wherein each of the top shank portions is straight.

11. The shopping cart bagging station of claim 1, wherein a length to width ratio of the support bar is from about 10:1 to about 20:1.

12. The shopping cart bagging station of claim 11, wherein a length to width ratio of the support bar is about 15:1.

13. The shopping cart bagging station of claim 1, wherein the top hook end portion is longer than the top shank portion.

14. The shopping cart bagging station of claim 1, wherein a top shank portion width is constant over a top shank portion length.

15. The shopping cart bagging station of claim 1, wherein a top hook end portion width tapers along a top hook end portion length.

16. A combination shopping cart and shopping cart bagging station, the combination comprising:
a shopping cart having at least one shopping cart side; and
a shopping cart bagging station comprising:
a support bar comprising:
a support bar first end;
a support bar second end opposing the support bar first end;
a support bar top edge;
a support bar bottom edge;
a support bar lateral axis; and
a support bar longitudinal axis, wherein the support bar lateral axis and the support bar longitudinal axis lie in a support bar plane;
three top hooks fixedly coupled to the support bar top edge, wherein each of the three top hooks comprises:
a top hook bar comprising:
a top hook bar first end coupled to the support bar top edge;
a top hook bar second end opposing the top hook bar first end;
a top hook bar lateral bend between the top hook bar first end and the top hook bar second end; and
a top shank portion that extends from the top hook bar first end to the top hook bar lateral bend, wherein the top shank portion extends perpendicularly from the support bar top edge, and wherein the top shank portion lies in the support bar plane; and
a top hook end portion that extends from the top hook bar lateral bend to the top hook bar second end;
wherein the top hook bar folds back on itself at the top hook bar lateral bend forming a top hook bar angle between the top shank portion and the top hook end portion from about 10 degrees to about 50 degrees; and
three bottom hooks fixedly attached to the support bar bottom edge, wherein each of the three bottom hooks comprises:
a bottom hook bar comprising:
a bottom hook bar first end coupled to the support bar bottom edge;
a bottom hook bar second end opposing the bottom hook bar first end; and
a bottom hook bar lateral bend between the bottom hook bar first end and the bottom hook bar second end;
a bottom shank portion that extends from the bottom hook bar first end to the bottom hook bar lateral bend, wherein the bottom shank portion extends perpendicularly from the support bar bottom edge, and wherein the bottom shank portion lies in the support bar plane; and
a bottom hook end portion that extends from the bottom hook bar lateral bend to the bottom hook bar second end;
wherein the bottom hook bar folds back on itself at the bottom hook bar lateral bend forming a bottom hook bar angle between the bottom shank portion and the bottom hook end portion of from about 10 degrees to about 50 degrees; and
wherein each of the three bottom hooks is used to hold at least one shopping bag;
wherein each of the three top hooks are coupled to a rod of the at least one shopping cart side.

17. The combination of claim 16, wherein a first top hook of the three top hooks is coupled to the support bar first end, a second top hook of the three top hooks is coupled to the support bar second end, and a third top hook of the three top hooks is coupled to a support bar midpoint.

18. The combination of claim 17, wherein each bottom hook bar comprises a bottom hook bar longitudinal axis that is collinear with a corresponding top hook bar longitudinal axis of each corresponding top hook.

* * * * *